US009570027B2

(12) United States Patent
Kim et al.

(10) Patent No.: US 9,570,027 B2
(45) Date of Patent: Feb. 14, 2017

(54) METHOD OF PROTECTING A GATE DRIVER CIRCUIT AND DISPLAY APPARATUS PERFORMING THE METHOD

(71) Applicant: SAMSUNG DISPLAY CO., LTD., Yongin, Gyeonggi-Do (KR)

(72) Inventors: Jun-Dal Kim, Asan-si (KR); Jong-Jae Lee, Hwaseong-si (KR); Bon-Sung Koo, Seongnam-si (KR); Yang-Uk Nam, Seoul (KR); Se-Young Heo, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 363 days.

(21) Appl. No.: 14/454,063

(22) Filed: Aug. 7, 2014

(65) Prior Publication Data

US 2015/0194800 A1 Jul. 9, 2015

(30) Foreign Application Priority Data

Jan. 7, 2014 (KR) ........................ 10-2014-0001797

(51) Int. Cl.
*H02H 3/00* (2006.01)
*G09G 3/36* (2006.01)

(52) U.S. Cl.
CPC ...... *G09G 3/3677* (2013.01); *G09G 2330/025* (2013.01)

(58) Field of Classification Search
CPC .................................................... G06G 3/3677
USPC ............................................................ 361/95
See application file for complete search history.

(56) References Cited

U.S. PATENT DOCUMENTS

| | | | | |
|---|---|---|---|---|
| 6,812,916 B2 | 11/2004 | Hwang | | |
| 7,466,312 B2 | 12/2008 | Choi et al. | | |
| 8,692,757 B2 * | 4/2014 | Bang | G09G 3/3648 | 345/100 |
| 9,275,591 B2 * | 3/2016 | Bang | G09G 3/3648 | |
| 2014/0016240 A1 * | 1/2014 | Kawata | H02H 3/0935 | 361/95 |

FOREIGN PATENT DOCUMENTS

| | | |
|---|---|---|
| JP | 2006-317926 A | 11/2006 |
| JP | 2007-248902 A | 9/2007 |
| JP | 2011-216663 A | 10/2011 |
| KR | 10-0407973 B1 | 11/2003 |
| KR | 1020060001425 A | 1/2006 |
| KR | 1020070019377 A | 2/2007 |
| KR | 1020070035373 A | 3/2007 |
| KR | 10-1127865 B1 | 3/2012 |

* cited by examiner

*Primary Examiner* — Stephen W Jackson
(74) *Attorney, Agent, or Firm* — Cantor Colburn LLP

(57) ABSTRACT

A method of method of protecting a gate driver circuit configured to provide a gate line of a display panel with a gate signal includes generating a clock signal to drive the gate driver circuit, sensing an output current of the clock signal, detecting an overcurrent of the clock signal based on an overcurrent determining factor, determining whether the clock signal is in an overcurrent condition based on a count number of the overcurrent, generating a shutdown signal when the clock signal is in the overcurrent condition and blocking the clock signal from being applied to the gate driver circuit based on the shutdown signal.

20 Claims, 7 Drawing Sheets

[OVERCURRENT MAINTAINING PERIOD<Td:Not Count]

METHOD OF PROTECTING A GATE DRIVER CIRCUIT AND DISPLAY APPARATUS PERFORMING THE METHOD

This application claims priority to Korean Patent Application No. 10-2014-0001797 filed on Jan. 7, 2014, and all the benefits accruing therefrom under 35 U.S.C. §119, the content of which in its entirety is herein incorporated by reference.

BACKGROUND

1. Field

Exemplary embodiments of the invention relate to a method of protecting a gate driver circuit and a display apparatus performing the method. More particularly, exemplary embodiments of the invention relate to a method of protecting a gate driver circuit from an overcurrent and a display apparatus performing the method.

2. Description of the Related Art

Generally, a liquid crystal display ("LCD") device includes an LCD panel that displays an image by controlling light transmittance of liquid crystal molecules, and a backlight assembly disposed below the LCD panel to provide the LCD panel with light.

The LCD device typically includes a display panel in which a plurality of pixel parts connected to gate lines and data lines crossing the gate lines are provided, a gate drive circuit for outputting a gate signal to the gate lines, and a data drive circuit for outputting a data signal to the data lines. The gate drive circuit and the data drive circuit may be provided in a chip type, and may be disposed on the display panel. A pixel typically includes a pixel electrode and a thin film transistor. The thin film transistor is connected to a data line, a gate line and the pixel electrode, and drives the pixel electrode. Generally, the thin film transistor includes an active layer having amorphous silicon.

In order to decrease a total size of a gate drive circuit and to reduce the size of an LCD and to simplify the manufacture of the LCD, a process in which the gate driving circuit is integrated on the LCD panel has been developed. The gate drive circuit includes a thin film transistor which may be provided via a process substantially the same as a process for providing the thin film transistor of the pixel.

SUMMARY

Exemplary embodiments of the invention provide a method of protecting a gate driver circuit from an overcurrent.

Exemplary embodiments of the invention provide a display apparatus performing the method of protecting the gate driver circuit.

According to an exemplary embodiment of the invention, a method of protecting a gate driver circuit configured to provide a gate line of a display panel with a gate signal includes generating a clock signal to drive the gate driver circuit, sensing an output current of the clock signal, determining an overcurrent of the clock signal based on an overcurrent determining factor, determining whether the clock signal is in an overcurrent condition based on a count number of the overcurrent, generating a shutdown signal when the clock signal is in the overcurrent condition, and blocking the clock signal from being applied to the gate driver circuit based on the shutdown signal.

In an exemplary embodiment, the detecting the overcurrent of the clock signal based on the overcurrent determining factor may include determining the output current of the clock signal is the overcurrent when a level of the output current of the clock signal is higher than an overcurrent level during an entire period of a detecting period from a rising timing of a clock control signal, where the clock control signal may be configured to control a phase of the clock signal.

In an exemplary embodiment, the detecting the overcurrent of the clock signal based on the overcurrent determining factor may further include determining the output current of the clock signal is not the overcurrent when the level of the output current of the clock signal is higher than the overcurrent level only during a partial period of the detecting period from the rising timing of the clock control signal.

In an exemplary embodiment, the method may further include determining the clock signal is in the overcurrent condition when a count number of the overcurrent exceeds a reference number.

In an exemplary embodiment, the method may further include counting the overcurrent from a falling timing of a vertical start signal of a current frame until a rising timing of a vertical start signal of a next frame, where the vertical start signal may be configured to control a start timing of the gate driver circuit.

In an exemplary embodiment, the method may further include non-counting the overcurrent while the vertical start signal is in a high level.

In an exemplary embodiment, the generating the clock signal may include generating a plurality of clock signals, where the clock signals may include a first clock signal having a phase substantially the same as a phase of the clock control signal and a second clock signal having a phase opposite to the phase of the clock control signal.

In an exemplary embodiment, the overcurrent of the first clock signal may be determined based on the overcurrent level in a first phase direction, and the overcurrent of the second clock signal may be determined based on the overcurrent level in a second phase direction opposite to the first phase direction.

In an exemplary embodiment, when at least one of the first and second clock signals is in the overcurrent condition, the shutdown signal is generated.

In an exemplary embodiment, the method may further include generating a gate-on voltage which is configured to control a high level of the clock signal and a gate-off voltage which is configured to control a low level of the clock signal, where the gate-on voltage and the gate-off voltage may be not generated in response to the shutdown signal.

According to an exemplary embodiment of the invention, a display apparatus includes a display panel including a gate line and a data line crossing the gate line, a gate driver circuit configured to output a gate signal to the gate line, a gate control part configured to generate a clock signal to drive the gate driver circuit and an overcurrent protecting part configured to sense an output current of the clock signal, to detect an overcurrent of the clock signal based on an overcurrent determining factor and to generate a shutdown signal base on a count number of the overcurrent, and a driving voltage generating part configured to provide the gate control part with a gate-on voltage and a gate-off voltage to generate the clock signal and to shut down in response to the shutdown signal.

In an exemplary embodiment, the overcurrent protecting part may be configured to determine the output current of the clock signal is the overcurrent when a level of the output current of the clock signal is higher than an overcurrent level during an entire period of a detecting period from a rising timing of a clock control signal, where the clock control signal may be configured to control a phase of the clock signal.

In an exemplary embodiment, the overcurrent protecting part may be configured to determine the output current of the clock signal is not the overcurrent when the level of the output current of the clock signal is higher than an overcurrent level only during a partial period of the detecting period from the rising timing of the clock control signal.

In an exemplary embodiment, the overcurrent protecting part may be configured to determine that the clock signal is in the overcurrent condition when a count number of the overcurrent exceeds a reference number.

In an exemplary embodiment, the overcurrent protecting part may be configured to count the overcurrent from a falling timing of a vertical start signal of a current frame until a rising timing of a vertical start signal of a next frame, where the vertical start signal may be configured to control a start timing of the gate driver circuit.

In an exemplary embodiment, the overcurrent protecting part may be configured not to count the overcurrent while the vertical start signal is in a high level.

In an exemplary embodiment, the gate control part may be configured to generate a first clock signal having a phase substantially the same as a phase of the clock control signal and a second clock signal having a phase opposite to the phase of the clock control signal.

In an exemplary embodiment, the overcurrent protecting part may be configured to determine the overcurrent of the first clock signal based on the overcurrent level in a first phase direction and to determine the overcurrent of the second clock signal d based on the overcurrent level in a second phase direction opposite to the first phase direction.

In an exemplary embodiment, the overcurrent protecting part may be configured to generate the shutdown signal when at least one of the first and second clock signals is in the overcurrent condition.

In an exemplary embodiment, the gate control part may be configured to generate a plurality of first clock signals different from each other and a plurality of second clock signals opposite to the plurality of first clock signals, and the overcurrent protecting part may be configured to generate the shutdown signal when at least one of the plurality of first clock signals and the plurality of second clock signals is in the overcurrent condition.

According to exemplary embodiments of the invention described herein, when at least one clock signal among clock signals applied to gate driver circuit is determined as being in the overcurrent condition based on the overcurrent determining factor, the display apparatus may be driven with the latch mode. Therefore, in such embodiments, the gate driver circuit of the display apparatus may be protected from the overcurrent.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
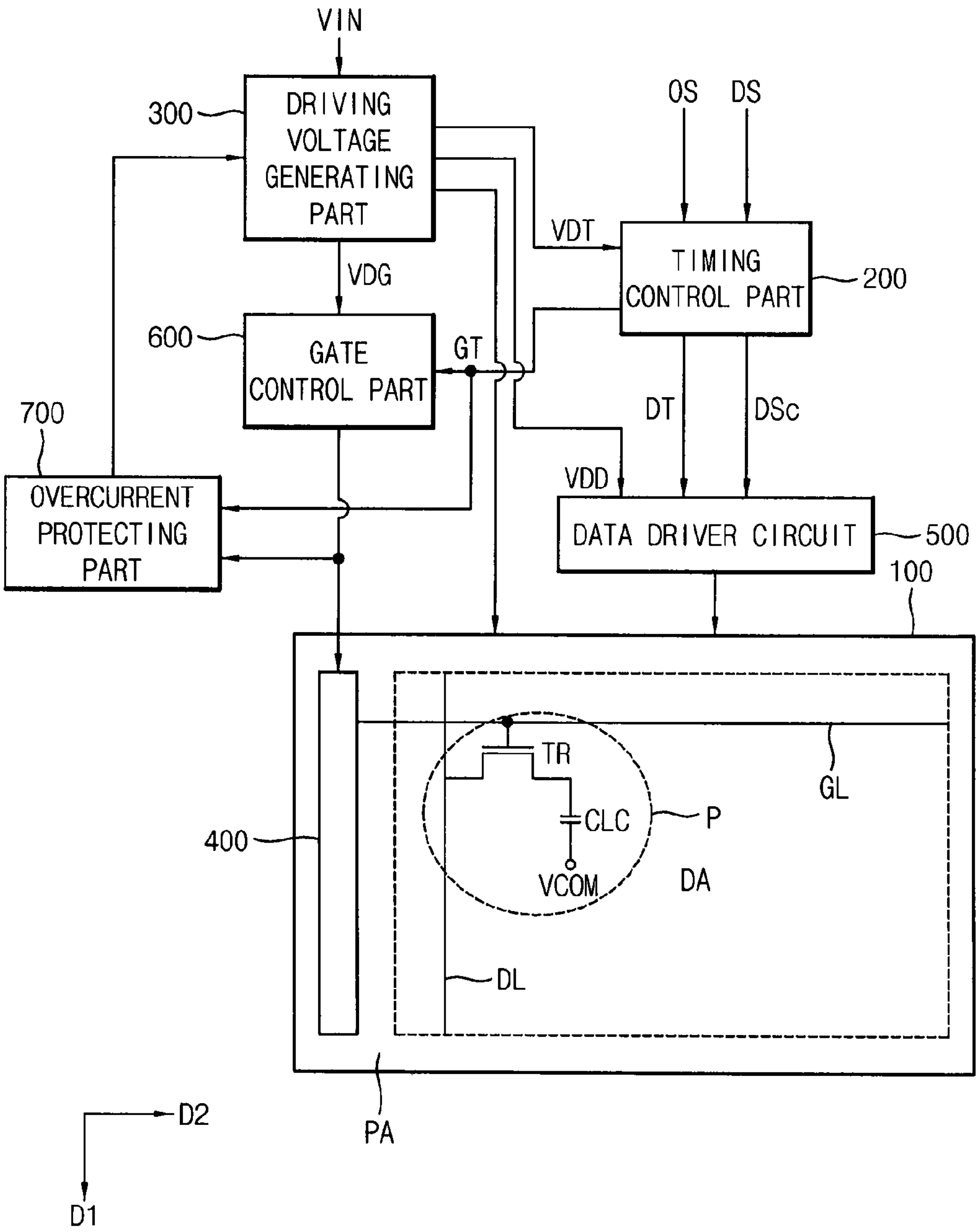
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be described in detail with reference to the accompanying drawings.

FIG. 1 is a block diagram illustrating an exemplary embodiment of a display apparatus according to the invention.

Referring to FIG. 1, an exemplary embodiment of the display apparatus may include a display panel 100, a timing control part 200, a driving voltage generating part 300, a gate driver circuit 400, a data driver circuit 500, a gate control part 600 and an overcurrent protecting part 700.

The display panel 100 may include a display area DA and a peripheral area PA surrounding the display area DA. A plurality of data lines DL, a plurality of gate lines GL and a plurality of pixels P are disposed in the display area DA. The data lines DL extend substantially in a first direction D1 and are arranged substantially in a second direction D2 crossing the first direction D1. The gate lines GL extend substantially in the second direction D2 and are arranged substantially in the first direction D1. Each of the pixels P may include a thin film transistor TR and a liquid crystal capacitor CLC. The thin film transistor TR is connected to a data line DL, a gate line GL and a first electrode of the liquid crystal capacitor CLC. The first electrode of the liquid crystal capacitor CLC may receive a data signal through the data line, and a second electrode of the liquid crystal capacitor CLC may be receive a common voltage VCOM.

The timing control part 200 may be configured to receive an original control signal OS and a data signal DS.

The timing control part 200 is configured to generate a plurality of timing signals based on the original control signal OS. The timing signals may include a data timing signal DT, which is configured to drive the data driver circuit 500, and a gate timing signal GT, which is configured to drive the gate control part 600. The data timing signal DT may include a vertical sync signal, a horizontal sync signal, a data clock signal, a load signal and so on. The gate timing signal GT may include a vertical start signal, a clock control signal and do on.

The timing control part 200 is configured to correct or compensate the data signal DS using various compensation algorithms and to provide the data driver circuit 500 with compensated data signal DSc.

The driving voltage generating part 300 is configured to generate a plurality of driving voltages using an input source voltage VIN.

The driving voltage may include a driving voltage VDT, which is configured to drive the timing control part 200, a data driving voltage VDD, which is configured to drive the data driver circuit 500, and a gate driving voltage VDG, which is configured to drive the gate control part 600. The data driving voltage VDD may include an analog source voltage and a digital source voltage. The gate driving voltage VDG may include a gate-on voltage and a gate-off voltage.

The gate driver circuit 400 is disposed in the peripheral area PA of the display panel 100. The gate driver circuit 400 is configured to generate a plurality of gate signals, which is applied to the gate lines GL.

In an exemplary embodiment, the gate driver circuit 400 includes a circuit thin film transistor, which is provided, e.g., formed, in the peripheral area PA via a process substantially the same as a process for forming the thin film transistor TR of the pixel P. Alternatively, the gate driver circuit 400 may be disposed, e.g., mounted, in the peripheral area PA as a tape carrier package ("TCP"), for example.

The data driver circuit 500 is disposed in the peripheral area PA of the display panel 100. The data driver circuit 500 is configured to convert the compensated data signal DSc received from the timing control part 200 to a data voltage using a gamma reference voltage and to provide the data line DL with the data voltage.

In an exemplary embodiment, the data driver circuit 500 may be disposed, e.g., mounted, on the peripheral area PA as the TCP. Alternatively, the data driver circuit 500 may be directly mounted on the peripheral area PA as a chip.

The gate control part 600 is configured to generate a plurality of clock signals using the gate timing signal GT and the gate driving voltage VDG. The gate control part 600 is configured to provide the gate driver circuit 400 with the clock signals.

The clock signals may include a clock signal and an inverted clock signal of the clock signal. In one exemplary embodiment, for example, the clock signals may include first to N-th clock signals which are different from each other, and first to N-th inverted clock signals which have phases opposite to the first to N-th clock signals, respectively. Here, N is a natural number.

In one exemplary embodiment, for example, the gate control part 600 is configured to generate the clock signal and the inverted clock signal. The clock signal has a same phase as the clock control signal, a high level corresponding to a level of the gate-on voltage and a low level corresponding to a level of the gate-off voltage. The inverted clock signal is an inverted signal of the clock signal with respect to a reference level.

In an exemplary embodiment, the overcurrent protecting part 700 is configured to sense an output current of the clock signal and the inverted clock signal based on the gate timing signal GT. The overcurrent protecting part 700 is configured to detect an overcurrent of the clock signal and the inverted clock signal based on an overcurrent determining factor which is preset. In an exemplary embodiment, when a count number of the overcurrent of the clock signal or the inverted clock signal exceeds a reference number, the overcurrent protecting part 700 is configured to determine that the clock signal or the inverted clock signal is in an overcurrent condition. The overcurrent protecting part 700 is configured to generate a shutdown signal when the overcurrent condition is determined. The shutdown signal is a control signal which drives the display apparatus in a latch mode. The latch mode may be ended when the input source voltage VIN is newly received.

In one exemplary embodiment, for example, the overcurrent protecting part 700 is configured to provide the driving voltage generating part 300 with the shutdown signal. Thus, the driving voltage generating part 300 is shutdown based on the shutdown signal, and the display apparatus may be driven in the latch mode.

Therefore, in such an embodiment, when at least one of the plurality of clock signals and the plurality of inverted clock signals, which are applied to the gate driver circuit 400, is in the overcurrent condition, the overcurrent protecting part 700 is configured to block the plurality of clock signals and the plurality of inverted clock signals from being applied to the gate driver circuit 400. Therefore, in such an embodiment, the overcurrent protecting part 700 may effectively protect the gate driver circuit 400 from the overcurrent.

FIGS. 2A to 2D are conceptual diagrams illustrating an exemplary embodiment of a method of detecting an overcurrent using an overcurrent protecting part of FIG. 1.

Hereinafter, an exemplary embodiment of the method of detecting the overcurrent by the overcurrent protecting part 700 will be described referring to the clock signal CKV.

Figure 2A:
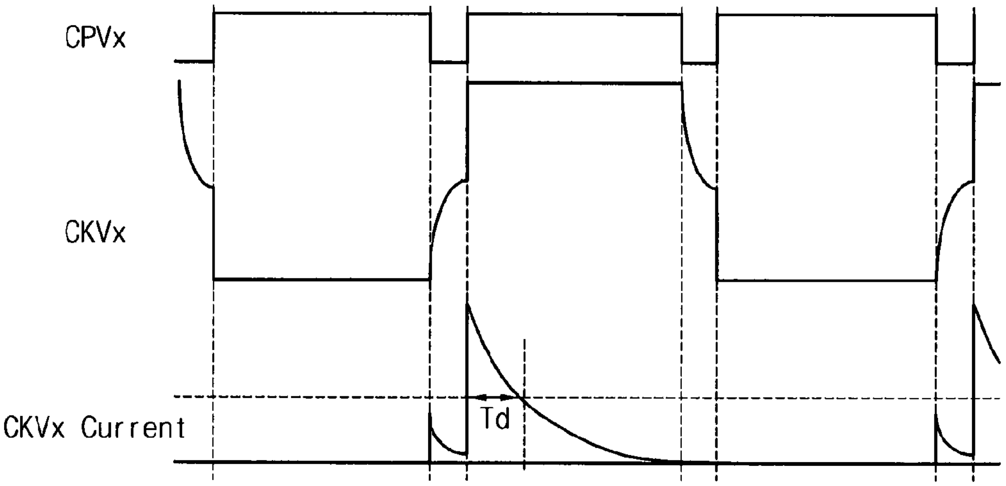
FIGS. 2A to 2D are conceptual diagrams illustrating an exemplary embodiment of a method of detecting an overcurrent using an overcurrent protecting part of FIG. 1.

Referring to FIGS. 1 and 2A, the overcurrent protecting part 700 is configured to sense an output current CKVx_Current of a clock signal CKVx received at an output terminal of the gate control part 600 based on a rising timing of a clock control signal CPVx.

The overcurrent determining factor may include a detecting time Td and an overcurrent level OCP Level.

When a level of the output current CKVx_Current is maintained to a level substantially equal to or higher than the overcurrent level OCP Level during the detecting time Td from the rising timing of the clock control signal CPVx, the overcurrent protecting part 700 determines that the overcurrent OC is detected.

Figure 2B:
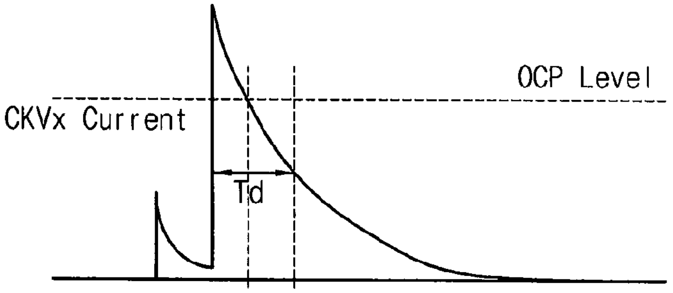

In such an embodiment, referring to FIG. 2B, when a level of the output current CKVx_Current is not maintained to the level equal to or higher than the overcurrent level OCP Level during the detecting time Td from the rising timing of the clock control signal CPVx, the overcurrent protecting part 700 determines that the overcurrent OC is not detected.

Figure 2C:
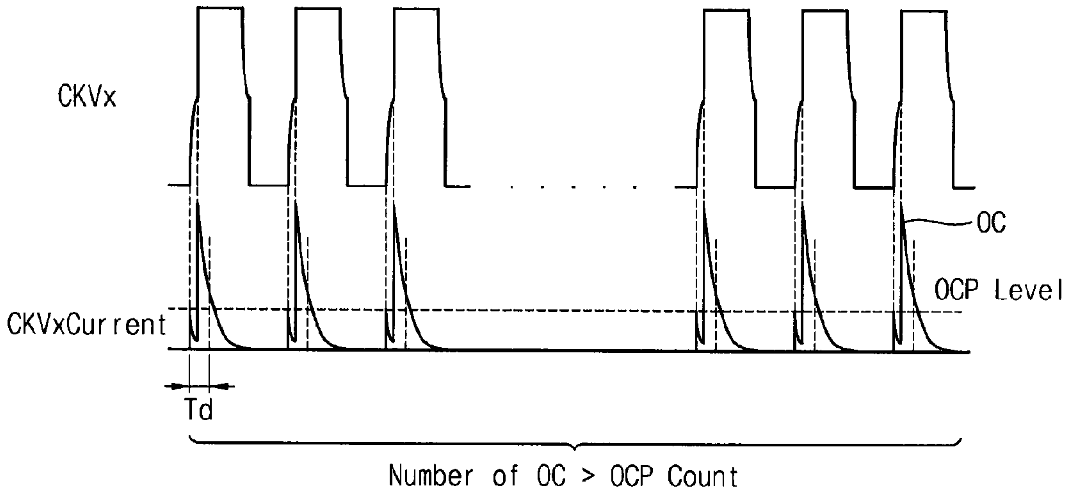

Referring to FIG. 2C, the overcurrent determining factor may further include a reference number.

The overcurrent protecting part 700 is configured to count a number of the overcurrent OC. In such an embodiment, when a count number of the overcurrent OC exceeds the reference number OCP Count, the overcurrent protecting part 700 is configured to determine that the clock signal CKVx is in the overcurrent condition. The overcurrent protecting part 700 is configured to generate a shutdown signal when the clock signal CKVx is in the overcurrent condition.

However, in such an embodiment, when the count number of the overcurrent OC does not exceed the reference number OCP Count, the overcurrent protecting part 700 is configured to determine that the clock signal CKVx is in a normal condition. Thus, the clock signal CKVx may be normally applied to the gate driver circuit 400.

Figure 2D:
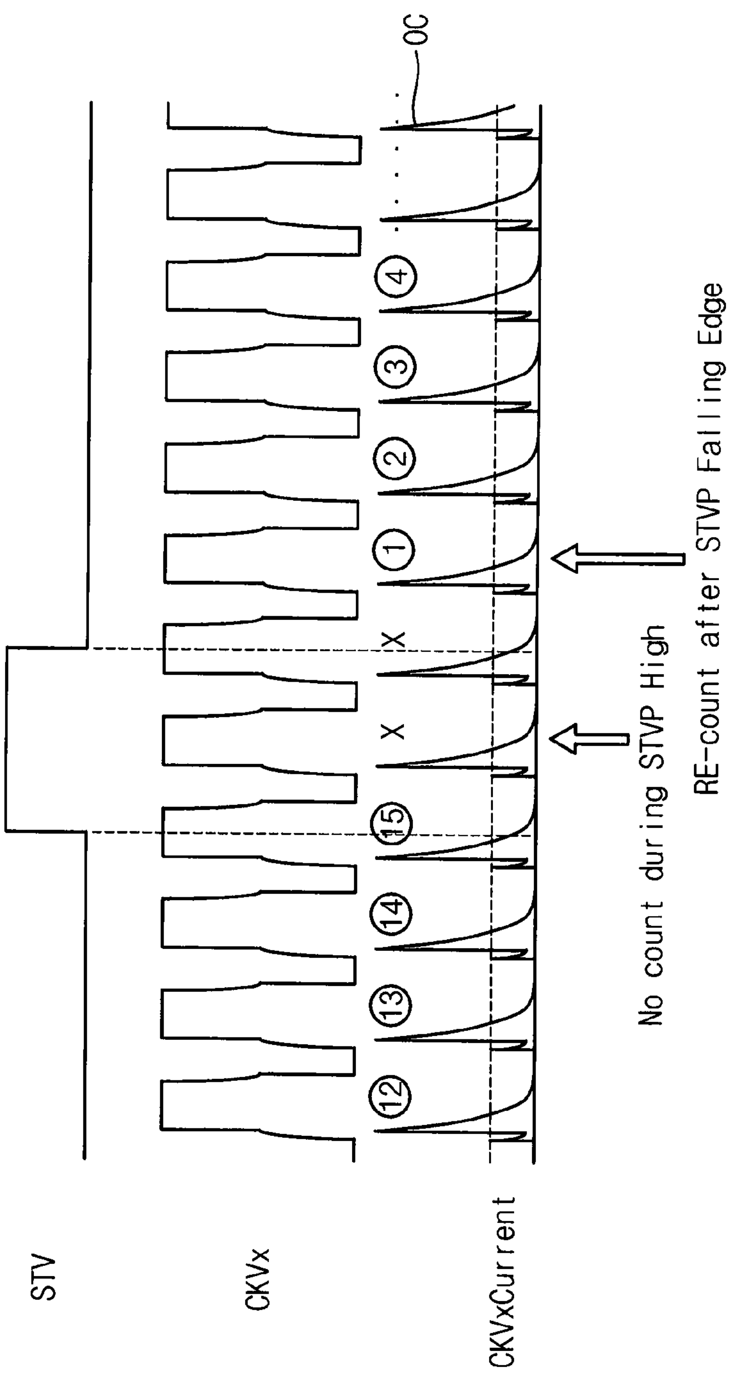

Referring to FIG. 2D, the overcurrent protecting part 700 is configured to reset the count number of the overcurrent OC when the vertical start signal STV of a next frame is received. Then, the overcurrent protecting part 700 is configured to recount the number of the overcurrent OC during the next frame.

In one exemplary embodiment, for example, as shown in FIG. 2D, the overcurrent protecting part 700 is configured to count the overcurrent OC from a falling timing of the vertical start signal STV of a current frame until the vertical start signal STV of the next frame is received, that is, until the rising timing of the vertical start signal STV of the next frame, not to count the overcurrent OC while the vertical start signal STV of the next frame is in a high level, and then to recount the overcurrent OC from a falling timing of the vertical start signal STV of the next frame.

Therefore, in an exemplary embodiment, when the count number of the overcurrent OC does not exceed the reference number OCP Count until the vertical start signal STV is received, the overcurrent protecting part 700 is configured to determine that the clock signal CKVx is in the normal condition.

As described above, in such an embodiment, the overcurrent condition may be determined in each frame period in synchronization with the vertical start signal STV.

Figure 3:
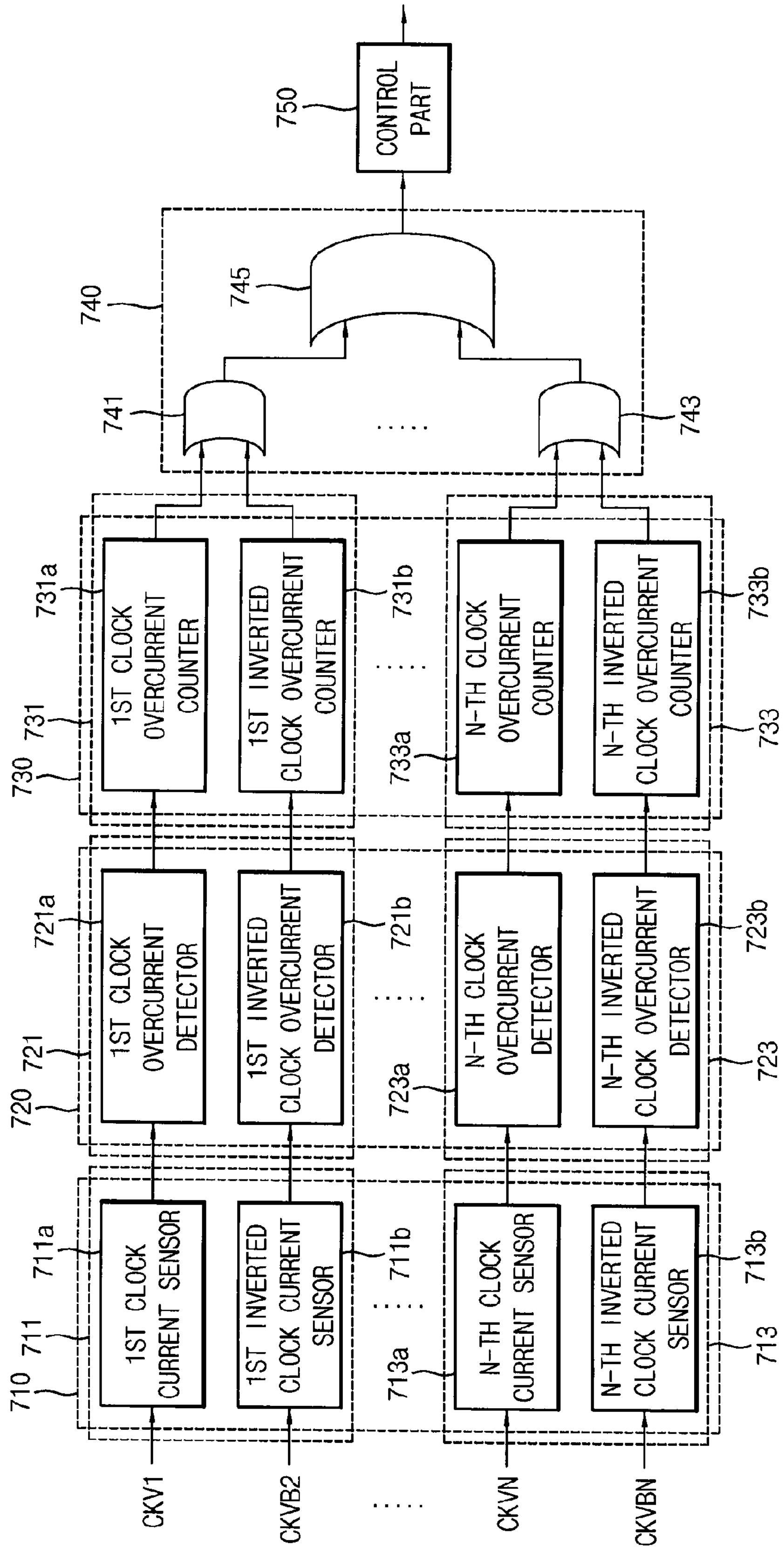
FIG. 3 is a block diagram illustrating an exemplary embodiment of an overcurrent protecting part according to the invention.
Figure 4:
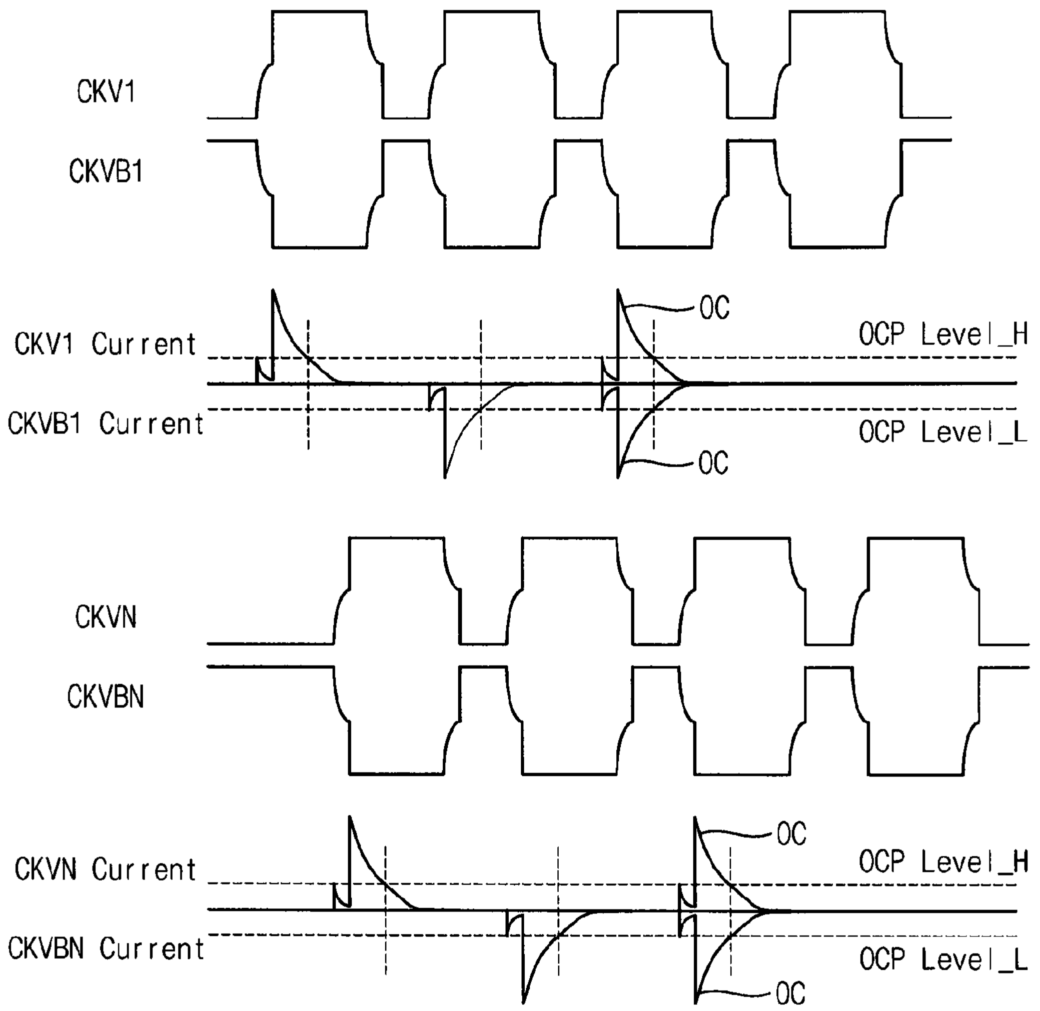
FIG. 4 is a conceptual diagram illustrating an exemplary embodiment of a method of operating the overcurrent protecting part of FIG. 3.

FIG. 3 is a block diagram illustrating an exemplary embodiment of an overcurrent protecting part according to the invention. FIG. 4 is a conceptual diagram illustrating an exemplary embodiment of a method of operating the overcurrent protecting part of FIG. 3.

Referring to FIGS. 1, 3 and 4, an exemplary embodiment of the overcurrent protecting part 700 is configured to receive first to N-th clock signals CKV1 to CKVN and first to N-th inverted clock signals CKVB1 to CKVBN opposite to the first to N-th clock signals CKV1 to CKVN from the gate control part 600. Here, N is a natural number.

The overcurrent protecting part 700 is configured to receive a gate timing signal, which includes first to N-th clock control signals CPV1 to CPVN and a vertical start signal STV, from the timing control part 200.

The overcurrent protecting part 700 may include a plurality of current sensing parts 710, a plurality of overcurrent determining parts 720, a plurality of overcurrent counting parts 730, an overcurrent determining part 740 and a control part 750.

The plurality of current sensing parts 710 may include a first current sensing part 711 to an N-th current sensing part 713.

The first current sensing part 711 may include a first clock current sensor 711*a* and a first inverted clock current sensor 711*b*.

The first clock current sensor 711*a* is configured to sense an output current CKV1_Current of a first clock signal CKV1 during a rising timing of a first clock control signal CPV1. The first inverted clock current sensor 711*b* is configured to sense an output current CKVB1_Current of a first inverted clock signal CKVB1 during the rising timing of the first clock control signal CPV1.

The output current CKV1_Current of the first clock signal CKV1 has a peak current in a positive direction (i.e., a positive peak current), and the output current CKVB1_Current of the first inverted clock signal CKVB1 has a peak current in a negative direction (i.e., a negative peak current). Herein, "in a positive direction" means above or higher than a reference current level, with which a clock signal and an inverted clock signal are inverted from each other, and "in a negative direction" means below or lower than the reference current level.

The N-th current sensing part 713 may include an N-th clock current sensor 713*a* and an N-th inverted clock current sensor 713*b*.

The N-th clock current sensor 713*a* is configured to sense an output current CKVN_Current of an N-th clock signal CKVN during a rising timing of an N-th clock control signal CPVN. The N-th inverted clock current sensor 713*b* is configured to sense an output current CKVBN_Current of an N-th inverted clock signal CKVBN during the rising timing of the N-th clock control signal CPVN.

The output current CKVN_Current of the N-th clock signal CKVN CKV1 has a peak current in the positive direction, and the output current CKVBN_Current of the N-th inverted clock signal CKVBN has a peak current in the negative direction.

The plurality of overcurrent determining parts 720 may include a first overcurrent determining part 721 to an N-th overcurrent determining part 723.

The first overcurrent determining part 721 may include a first clock overcurrent detector 721*a* and a first inverted clock overcurrent detector 721*b*.

The first clock overcurrent detector 721*a* is configured to determine whether the output current CKV1_Current of the first clock signal CKV1 is an overcurrent. The first clock overcurrent detector 721*a* detects the overcurrent OC in the output current CKV1_Current of the first clock signal CKV1, when the output current CKV1_Current of the first clock signal CKV1 exceeds a first overcurrent level OCP Level_H during the detecting time Td.

The first inverted clock overcurrent detector 721*b* is configured to determine whether the output current CKVB1_Current of the first inverted clock signal CKVB1 is an overcurrent. The first inverted clock overcurrent detector 721*b* detects the overcurrent OC in the output current CKVB1_Current of the first inverted clock signal CKVB1, when the output current CKVB1_Current of the first inverted clock signal CKVB1 exceeds a second overcurrent level OCP Level_L during the detecting time Td. The first overcurrent level OCP Level_H is in the positive direction, and the second overcurrent level OCP Level_L is in the negative direction.

The N-th overcurrent determining part 723 may include an N-th clock overcurrent detector 723*a* and an N-th inverted clock overcurrent detector 723*b*.

The N-th clock overcurrent detector 723*a* is configured to determine whether the output current CKVN_Current of the N-th clock signal CKVN is the overcurrent. The N-th clock overcurrent detector 723*a* detects the overcurrent OC in the output current CKVN_Current of the N-th clock signal CKVN, when the output current CKVN_Current of the N-th clock signal CKVN exceeds the first overcurrent level OCP Level_H during the detecting time Td.

The N-th inverted clock overcurrent detector 723*b* is configured to determine whether the output current CKVBN_Current of the N-th inverted clock signal CKVBN is an overcurrent. The N-th inverted clock overcurrent detector 723*b* detects the overcurrent OC in the output current CKVBN_Current of the N-th inverted clock signal CKVBN, when the output current CKVBN_Current of the N-th inverted clock signal CKVBN exceeds the second overcurrent level OCP Level_L during the detecting time Td.

The plurality of overcurrent counting parts 730 may include a first overcurrent counting part 731 to an N-th overcurrent counting part 733.

The first overcurrent counting part 731 may include a first clock overcurrent counter 731*a* and a first inverted clock overcurrent counter 731*b*.

The first clock overcurrent counter 731*a* is configured to count the overcurrent of the first clock signal CKV1. When a count number of the overcurrent in the first clock signal CKV1 exceeds a reference number OCP Count, the first clock signal CKV1 is determined to being in an overcurrent condition, and thus the first clock overcurrent counter 731*a* is configured to output an overcurrent signal in a high level. When the count number of the overcurrent in the first clock signal CKV1 does not exceed the reference number OCP Count, the first clock signal CKV1 is determined to being in a normal condition, and thus the first clock overcurrent counter 731*a* is configured to output the overcurrent signal of a low level.

The first inverted clock overcurrent counter 731*b* is configured to count the overcurrent of the first inverted clock signal CKVB1. When a count number of the overcurrent in the first inverted clock signal CKVB1 exceeds the reference number OCP Count, the first inverted clock signal CKVB1 is determined to being in the overcurrent condition, and thus the first inverted clock overcurrent counter 731*b* is configured to output the overcurrent signal in the high level. When the count number of the overcurrent in the first inverted clock signal CKVB1 does not exceed the reference number OCP Count, the first inverted clock signal CKVB1 is determined to being in the normal condition, and thus the first inverted clock overcurrent counter 731*b* is configured to output the overcurrent signal in the low level.

The N-th overcurrent counting part 733 may include an N-th clock overcurrent counter 733*a* and an N-th inverted clock overcurrent counter 733*b*.

The N-th clock overcurrent counter 733*a* is configured to count the overcurrent of the N-th clock signal CKVN. When a count number of the overcurrent in the N-th clock signal CKVN exceeds the reference number OCP Count, N-th clock signal CKVN is determined to being in the overcurrent condition, and thus the N-th clock overcurrent counter 733*a* is configured to output the overcurrent signal of the high level. When the count number of the overcurrent in the N-th clock signal CKVN does not exceed the reference number OCP Count, the N-th clock signal CKVN is determined to being in the normal condition, and thus the N-th clock overcurrent counter 733*a* is configured to output the overcurrent signal of the low level.

The N-th inverted clock overcurrent counter 733*b* is configured to count the overcurrent of the N-th inverted clock signal CKVBN. When a count number of the overcurrent in the N-th inverted clock signal CKVBN exceeds the reference number OCP Count, the N-th inverted clock signal CKVBN is determined to being in the overcurrent condition, and thus the N-th inverted clock overcurrent counter 733*b* is configured to output the overcurrent signal of the high level. When the count number of the overcurrent in the N-th inverted clock signal CKVBN does not exceed the reference number OCP Count, the N-th inverted clock signal CKVBN is determined to being in the normal condition, and thus the N-th inverted clock overcurrent counter 733*b* is configured to output the overcurrent signal of the low level.

The overcurrent determining part 740 may include a first to an N-th overcurrent determining parts 741 to 743 and a final determining part 745.

The first overcurrent determining part 741 is configured to receive the overcurrent signals from the first clock overcurrent counter 731*a* and the first inverted clock counter 731*b* and to output a determining signal in a high level when at least one of the overcurrent signals is in the high level. The first overcurrent determining part 741 is configured to output the determining signal in a low level when all of the overcurrent signals from the first clock overcurrent counter 731*a* and the first inverted clock counter 731*b* are in the high level.

The N-th overcurrent determining part 743 is configured to receive the overcurrent signals from the N-th clock overcurrent counter 733*a* and the N-th inverted clock counter 733*b* and to output a determining signal in the high level when at least one of the overcurrent signals is in the high level. The N-th overcurrent determining part 743 is configured to output the determining signal in the low level when all of the overcurrent signals from the N-th clock overcurrent counter 733*a* and the N-th inverted clock counter 733*b* are in the low level.

The final determining part 745 is configured to output a control signal in a high level when at least one of the determining signals received from the first to N-th overcurrent determining parts 741 to 743 in the high level. The final determining part 745 is configured to output the control signal in a low level when all of the determining signals received from the first to N-th overcurrent determining parts 741 to 743 are in the high level.

The control part 750 is configured to provide the driving voltage generating part 300 with a shutdown signal, when the control signal received from the final determining part 745 is in the high level. Thus, the driving voltage generating part 300 is driven in a latch mode in response to the shutdown signal.

The driving voltage generating part 300 is normally driven, when the control signal received from the final determining part 745 is in the low level. Thus, the plurality of clock signals and the plurality of inverted clock signals generated from the gate control part 600 may be applied to the gate driver circuit 400.

Therefore, in an exemplary embodiment, the clock signal, at least one of which is in the overcurrent condition, may be blocked from being applied to the gate driver circuit 400 such that the gate driver circuit 400 may be protected from the overcurrent.

Figure 5:
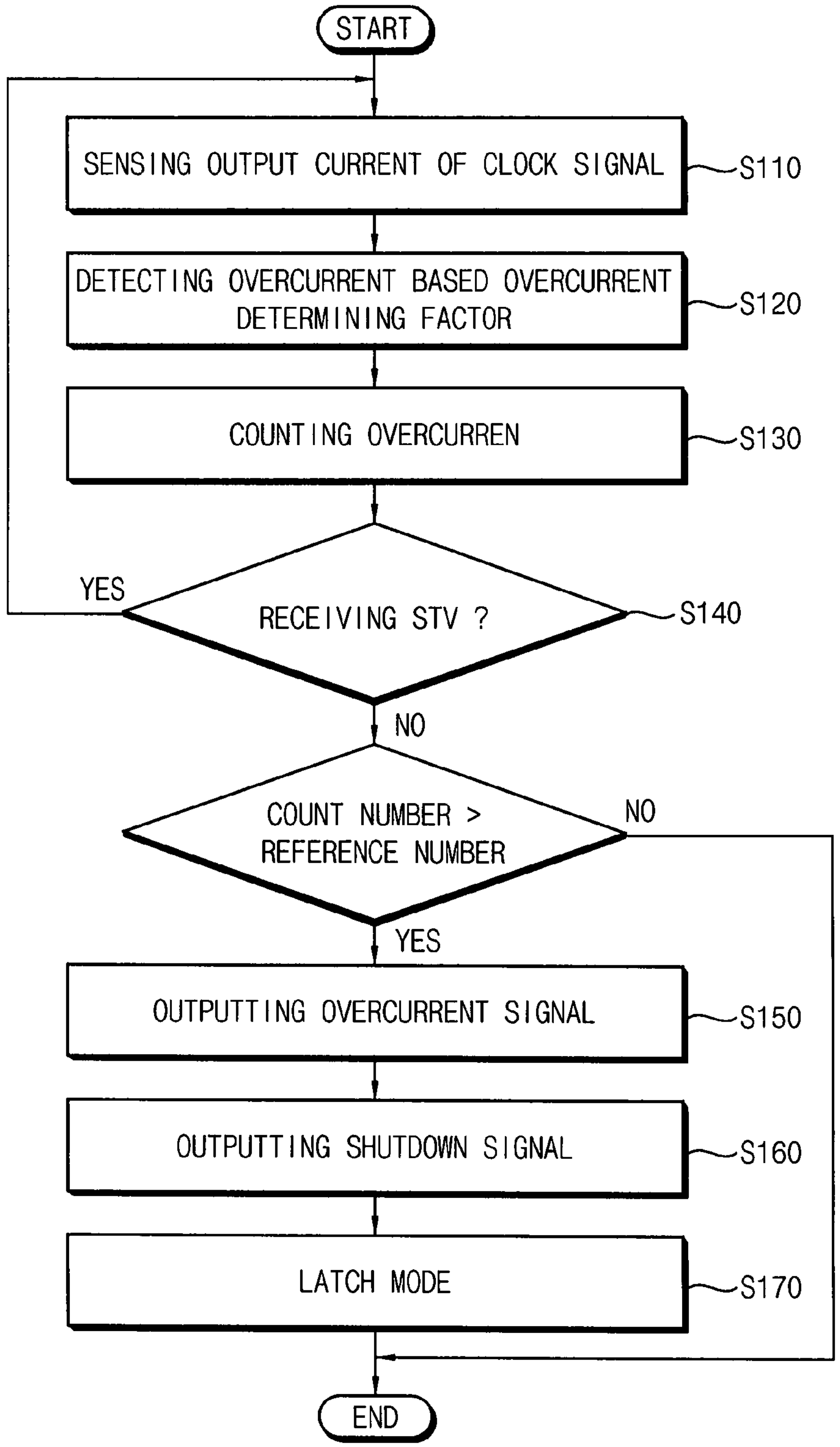
FIG. 5 is a flowchart illustrating an exemplary embodiment of a method of protecting a gate driver circuit, according to the invention.

FIG. 5 is a flowchart illustrating an exemplary embodiment of a method of protecting a gate driver circuit, according to the invention.

Referring to FIGS. 1, 3, 4 and 5, in an exemplary embodiment, an output current of a clock signal is sensed (S110). In an exemplary embodiment, the gate control part 600 is configured to generate the clock signal and the inverted clock signal. The clock signal has a same phase as the clock control signal, a high level corresponding to a level of the gate-on voltage and a low level corresponding to a level of the gate-off voltage. The inverted clock signal is an inverted signal of the clock signal with respect to a reference level.

The overcurrent protecting part 700 is configured to receive the first to N-th clock signals CKV1 to CKVN and the first to N-th inverted clock signals CKVB1 to CKVBN, which are opposite to the first to N-th clock signals CKV1 to CKVN, respectively, from the gate control part 600. The overcurrent protecting part 700 is configured to receive the gate timing signals, e.g., the first to N-th clock control signals CPV1 to CPVN, from the timing control part 200.

The first current sensing part 711 is configured to sense the output current CKV1_Current of the first clock signal CKV1 and the output current CKVB1_Current of the first inverted clock signal CKVB1 during a rising timing of the first clock control signal CPV1. The N-th current sensing part 713 is configured to sense the output current CKVN_Current of the N-th clock signal CKVN and the output current CKVBN_Current of the N-th inverted clock signal CKVBN during the rising timing of the N-th clock control signal CPVN.

In such an embodiment, an overcurrent is detected based on an overcurrent determining factor (S120). In an exemplary embodiment, the first overcurrent determining part 721 detects the overcurrent OC when the output current CKV1_Current of the first clock signal CKV1 exceeds the first overcurrent level OCP Level_H during the detecting time Td, and detects the overcurrent OC when the output current CKVB1_Current of the first inverted clock signal CKVB1 exceeds the second overcurrent level OCP Level_L during the detecting time Td. The N-th overcurrent determining part 723 detects the overcurrent OC when the output current CKVN_Current of the N-th clock signal CKVN exceeds the first overcurrent level OCP Level_H during the detecting time Td, and detects the overcurrent OC when the output current CKVBN_Current of the N-th inverted clock signal CKVBN exceeds the second overcurrent level OCP Level_L during the detecting time Td.

In such an embodiment, the overcurrent is counted (S130). The first overcurrent counting part 731 is configured to count the overcurrent of the first clock signal CKV1 and is configured to count the overcurrent of the first inverted clock signal CKVB1. The N-th overcurrent counting part 733 is configured to count the overcurrent of the N-th clock signal CKVN and is configured to count the overcurrent of the N-th inverted clock signal CKVBN.

In such an embodiment, the counting operation is controlled based on the start signal STV (S140). When the vertical start signal is received, each of the first to N-th overcurrent counting parts 731 to 733 is configured to reset and recount the count number of the overcurrent. In one exemplary embodiment, for example, as shown in FIG. 2D, the overcurrent counting parts 730 are configured to count the overcurrent OC until the vertical start signal STV of the next frame is received, not to count the overcurrent OC while the vertical start signal STV of the next frame is in a high level, and then to recount the overcurrent OC from a falling timing of the vertical start signal STV of the next frame.

In such an embodiment, an overcurrent signal is outputted based on the counted number of the overcurrent (S150). The first overcurrent counting part 731 is configured to determine that the first clock signal CKV1 is in the overcurrent condition when a count number of the overcurrent in the first clock signal CKV1 exceeds the reference number OCP Count, and is configured to determine that the first inverted clock signal CKVB1 is in the overcurrent condition when a count number of the overcurrent in the first inverted clock signal CKVB1 exceeds the reference number OCP Count, such that the overcurrent signal in the high level is outputted. The N-th overcurrent counting part 733 is configured to determine that the N-th clock signal CKVN is in the overcurrent condition when a count number of the overcurrent in the N-th clock signal CKVN exceeds the reference number OCP Count, and is configured to determine that the N-th inverted clock signal CKVBN is in the overcurrent condition when a count number of the overcurrent in the N-th inverted clock signal CKVBN exceeds the reference number OCP Count, such that the overcurrent signal in the high level is outputted.

In such an embodiment, the first overcurrent counting part 731 is configured to determine that the first clock signal CKV1 is in the normal condition when the count number of the overcurrent in the first clock signal CKV1 does not exceed the reference number OCP Count, and is configured to determine that configured to determine that the first inverted clock signal CKVB1 is in the normal condition when the count number of the overcurrent in the first inverted clock signal CKVB1 does not exceed the reference number OCP Count. When the first clock signal CKV1 and the first inverted clock signal CKVB1 are in the normal condition, the overcurrent signal in the low level is outputted. The N-th overcurrent counting part 733 is configured to determine that the N-th clock signal CKVN1 is in the normal condition when the count number of the overcurrent in the N-th clock signal CKVN does not exceed the reference number OCP Count, and is configured to determine that configured to determine that the N-th inverted clock signal CKVBN is in the normal condition when the count number of the overcurrent in the N-th inverted clock signal CKVBN does not exceed the reference number OCP Count. When the N-th clock signal CKVN and the N-th inverted clock signal CKVBN are in the normal condition, the overcurrent signal in the low level is outputted.

The first overcurrent determining part 741 is configured to output the determining signal in the high level when at least one of the overcurrent signals received from the first overcurrent counting part 731 is in the high level. The N-th overcurrent determining part 743 is configured to output the determining signal in the high level when at least one of the overcurrent signals received from the N-th overcurrent counting part 733 is in the high level.

The final determining part 745 is configured to output the control signal in the high level when at least one of the determining signals received from the first to N-th overcurrent determining parts 741 to 743 is in the high level.

In such an embodiment, a shutdown signal is outputted based on the overcurrent signal (S160). The control part 750 is configured to output the shutdown signal, when the control signal received from the final determining part 745 is in the high level. In one exemplary embodiment, for example, the control part 750 is configured to provide the driving voltage generating part 300 with the shutdown signal.

In such an embodiment, the driving voltage generating part 300 is driven in a latch mode in response to the shutdown signal (S170).

Therefore, in an exemplary embodiment, the clock signals, at least one of which is in the overcurrent condition, may be effectively blocked from being applied to the gate driver circuit 400 such that the gate driver circuit 400 may be protected from the overcurrent.

According to exemplary embodiments of the invention, when a clock signal, which is applied to a gate driver circuit, may be determined as being in the overcurrent condition based on the overcurrent determining factor, the display apparatus may be driven in the latch mode, such that the gate driver circuit of the display apparatus may be protected from the overcurrent.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of protecting a gate driver circuit configured to provide a gate line of a display panel with a gate signal, the method comprising:

generating a clock signal to drive the gate driver circuit;

sensing an output current of the clock signal;

detecting an overcurrent of the clock signal based on an overcurrent determining factor;

determining whether the clock signal is in an overcurrent condition based on a count number of the overcurrent;

generating a shutdown signal when the clock signal is in the overcurrent condition; and blocking the clock signal from being applied to the gate driver circuit based on the shutdown signal.

2. The method of claim 1, wherein the detecting the overcurrent of the clock signal based on the overcurrent determining factor comprises:

determining the output current of the clock signal is the overcurrent when a level of the output current of the clock signal is higher than an overcurrent level during an entire period of a detecting period from a rising timing of a clock control signal, wherein the clock control signal is configured to control a phase of the clock signal.

3. The method of claim 2, the detecting the overcurrent of the clock signal based on the overcurrent determining factor further comprises:

determining the output current of the clock signal is not the overcurrent when the level of the output current of the clock signal is higher than the overcurrent level only during a partial period of the detecting period from the rising timing of the clock control signal.

4. The method of claim 1, further comprising:

determining the clock signal is in the overcurrent condition when a count number of the overcurrent exceeds a reference number.

5. The method of claim 1, further comprising:

counting the overcurrent of the clock signal from a falling timing of a vertical start signal of a current frame until a rising timing of the vertical signal of a next frame, wherein the vertical start signal is configured to control a start timing of the gate driver circuit.

6. The method of claim 5, further comprising:

non-counting the overcurrent while the vertical start signal is in a high level.

7. The method of claim 5, wherein the generating the clock signal comprises generating a plurality of clock signals, wherein the clock signals comprise:

a first clock signal having a phase substantially the same as a phase of a clock control signal; and a second clock signal having a phase opposite to the phase of the clock control signal.

8. The method of claim 7, wherein the overcurrent of the first clock signal is determined based on an overcurrent level in a first phase direction, and the overcurrent of the second clock signal is determined based on the overcurrent level in a second phase direction opposite to the first phase direction.

9. The method of claim 8, wherein when at least one of the first and second clock signals is in the overcurrent condition, the shutdown signal is generated.

10. The method of claim 8, further comprising:

generating a gate-on voltage which is configured to control a high level of the clock signal and a gate-off voltage which is configured to control a low level of the clock signal, wherein the gate-on voltage and the gate-off voltage are not generated in response to the shutdown signal.

11. A display apparatus comprising:

a display panel comprising a gate line, and a data line crossing the gate line;

a gate driver circuit configured to output a gate signal to the gate line;

a gate control part configured to generate a clock signal to drive the gate driver circuit; and an overcurrent protecting part configured to sense an output current of the clock signal, to detect an overcurrent in the clock signal based on an overcurrent determining factor, and to generate a shutdown signal base on a count number of the overcurrent; and a driving voltage generating part configured to provide the gate control part with a gate-on voltage and a gate-off voltage to generate the clock signal and to shut down in response to the shutdown signal.

12. The display apparatus of claim 11, wherein the overcurrent protecting part is configured to determine the output current of the clock signal is the overcurrent when a level of the output current of the clock signal is higher than an overcurrent level during an entire period of a detecting period from a rising timing of a clock control signal, wherein the clock control signal is configured to control a phase of the clock signal.

13. The display apparatus of claim 12, wherein the overcurrent protecting part is configured to determine the output current of the clock signal is not the overcurrent when the level of the output current of the clock signal is higher than the overcurrent level only during a partial period of the detecting period from the rising timing of the clock control signal.

14. The display apparatus of claim 11, wherein the overcurrent protecting part is configured to determine that the clock signal is in the overcurrent condition when the count number of the overcurrent exceeds a reference number.

15. The display apparatus of claim 11, wherein the overcurrent protecting part is configured to count the overcurrent from a falling timing of a vertical start signal of a current frame until a rising timing of the vertical start signal of a next frame, wherein the vertical start signal is configured to control a start timing of the gate driver circuit.

16. The display apparatus of claim 15, wherein the overcurrent protecting part is configured not to count the overcurrent while the vertical start signal is in a high level.

17. The display apparatus of claim 15, wherein the gate control part is configured to generate a first clock signal having a phase substantially the same as a phase of a clock control signal and a second clock signal having a phase opposite to the phase of the clock control signal.

18. The display apparatus of claim 17, wherein the overcurrent protecting part is configured to determine the overcurrent of the first clock signal based on a overcurrent level in a first phase direction and to determine the overcurrent of the second clock signal based on the overcurrent level in a second phase direction opposite to the first phase direction.

19. The display apparatus of claim 18, wherein the overcurrent protecting part is configured to generate the shutdown signal when at least one of the first and second clock signals is in the overcurrent condition.

20. The display apparatus of claim 18, wherein the gate control part is configured to generate a plurality of first clock signals different from each other and a plurality of second clock signals opposite to the plurality of first clock signals, and the overcurrent protecting part is configured to generate the shutdown signal when at least one of the plurality of first clock signals and the plurality of second clock signals is in the overcurrent condition.

* * * * *